March 28, 1967 S. N. TOWER ET AL 3,311,540
INTEGRAL BOILING AND SUPERHEATING NUCLEAR REACTOR AND
PRESSURE TUBE ASSEMBLY THEREFOR
Filed May 28, 1964 5 Sheets-Sheet 4

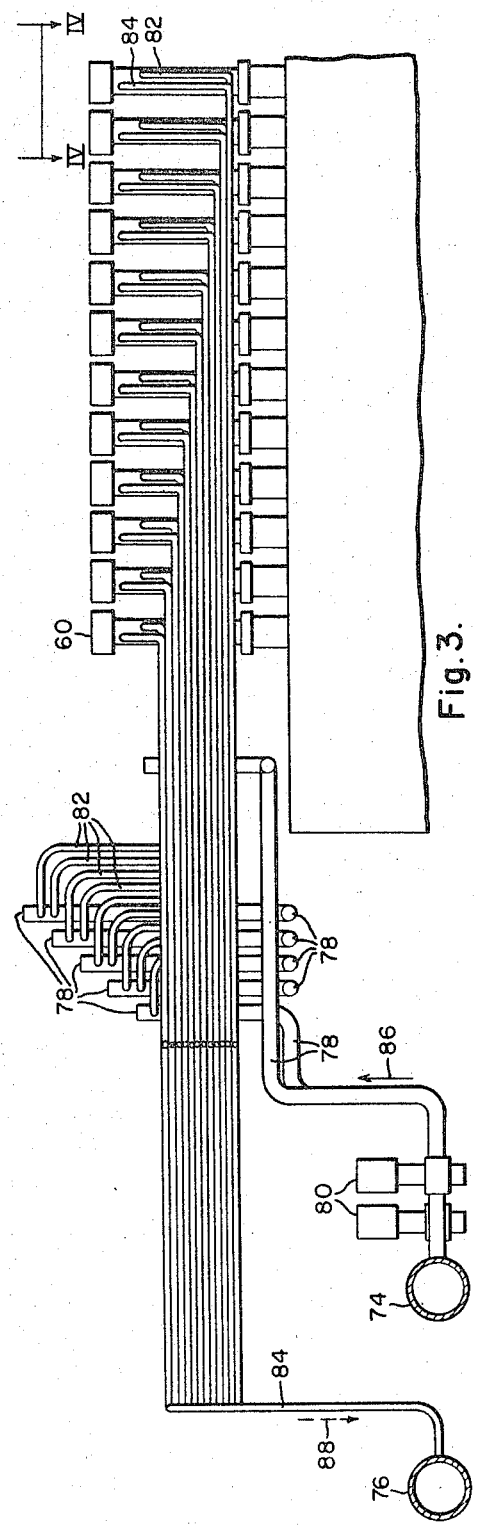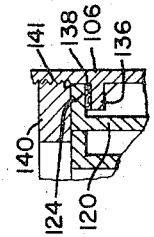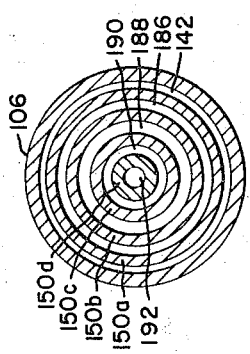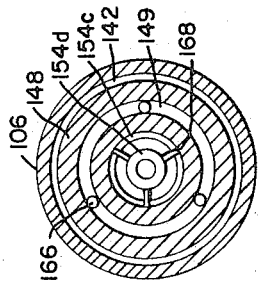

WITNESSES:

INVENTORS
Stephen N. Tower and
Theodore Stern.
BY

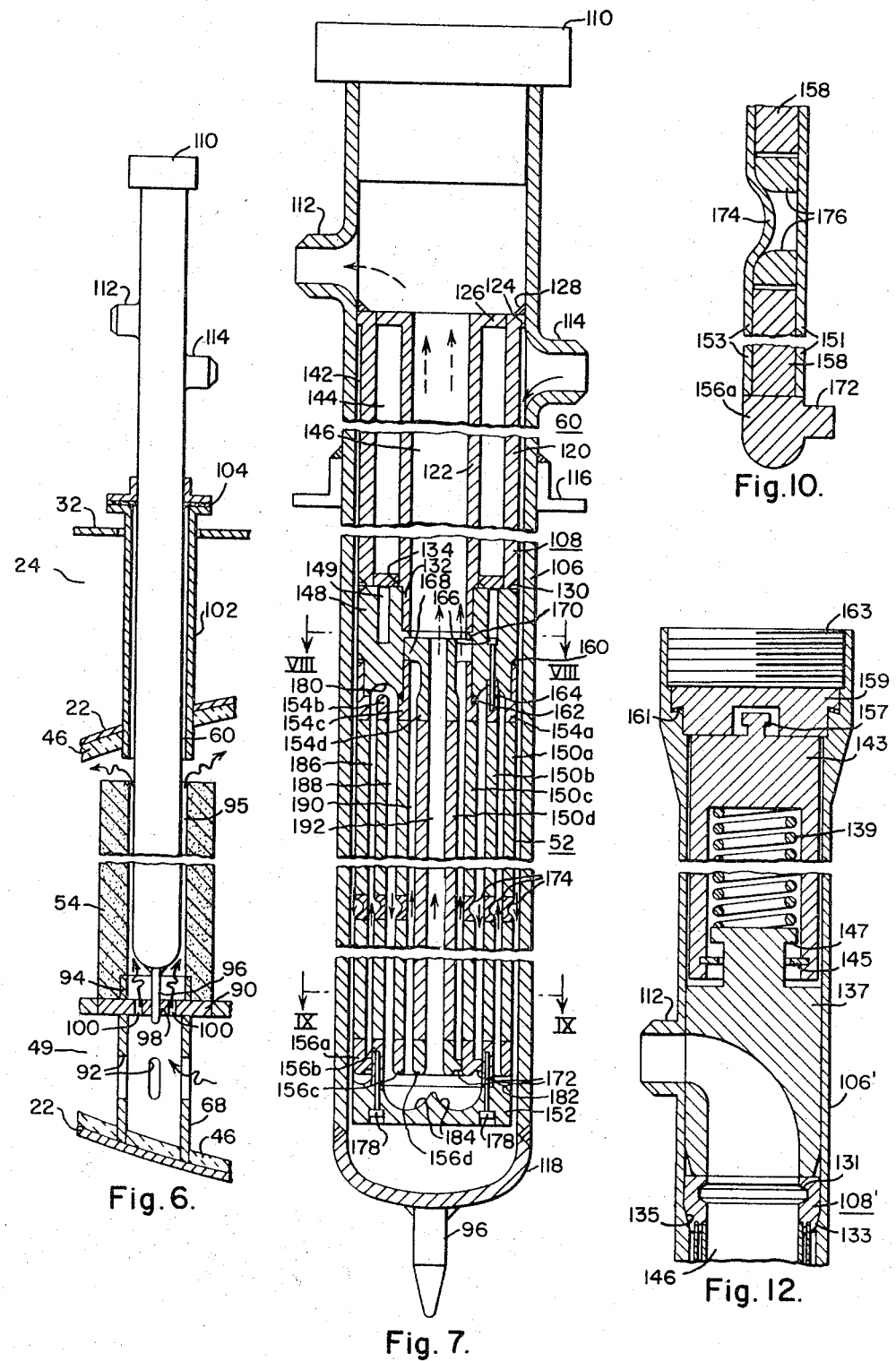

3,311,540
INTEGRAL BOILING AND SUPERHEATING NUCLEAR REACTOR AND PRESSURE TUBE ASSEMBLY THEREFOR
Stephen N. Tower, Murrysville, and Theodore Stern, Pittsburgh, Pa., assignors to Westinghouse Electric Corporation, East Pittsburgh, Pa., a corporation of Pennsylvania
Filed May 28, 1964, Ser. No. 370,838
19 Claims. (Cl. 176—53)

This invention relates in general to a direct cycle neutronic reactor and more particularly to an integral vapor generating and superheating reactor. More specifically, the reactor is of a once through tube type.

As is well known, a neutronic reactor is arranged for transferring the heat developed in the fissioning process maintained in the core of the reactor to a suitable working fluid such as water, steam or a combination thereof. Such fissioning is maintained by a chain reaction in a mass of fissionable isotope, such as $U_{233}$, $U_{235}$, $Pu_{239}$, $Pu_{241}$ or combinations thereof, confined within the core of the reactor. The fissioning process is induced by the capture of a thermalized neutron which, in turn, results in the splitting of the fissionable atom into additional neutrons and fission fragments. The latter neutrons are categorized as fast and are thermalized by moderator material admixed with or juxtaposed to the fissionable material. The fissioning process, therefore, becomes chain reacting as long as sufficient thermalized neutrons are made available for each succeeding generation of fissions. The fissioning and moderating materials usually are surrounded by a neutron-reflecting material for improvement in neutron economy. The thermalized neutron flux level, however, is controlled by the positioning or presence of control rods or other neutron absorptive materials employed in the reactor.

Direct cycle neutronic reactors of the prior art produced saturated vapor, such as saturated steam, which is used in external vapor utilizing means, such as steam turbines. However, "standard" steam turbines of today's power industry utilize high pressure superheated steam. These "standard" steam turbines are more efficient and cost considerably less than a saturated steam turbine.

Accordingly, it is the general object of this invention to provide a novel and more efficient direct cycle neutronic reactor.

It is a more particular object of this invention to provide a novel and more efficient integral boiling and superheating neutronic reactor of a "once through tube reactor" design, which is sometimes hereinafter referred to as OTTR.

Another object of this invention is to provide in a reactor a pressure tube design through which a flow of high pressure primary coolant can be maintained to absorb heat from the fissile fuel also contained within the pressure tube.

Still another object of this invention is to utilize a removable re-entrant type of pressure tube which sealably passes through one end of the reactor vessel and thereby eliminates the differential expansion problem between the re-entrant tube and the reactor vessel.

Still another object of this invention is to minimize the weight, space requirement, and power requirements for auxiliary equipment by eliminating vapor pumps, for example as used in the "Loeffler" cycle, required to force saturated vapor through separate external vapor superheaters and eliminating heat sources external to the reactor used for superheating saturated vapor.

Still another object of this invention is to contain the moderator in a low pressure vessel within which a fluid coolant arrangement such as an inert gas blanket is maintained and circulated to facilitate heat transfer from the moderator, which operates at a high temperature relative to the incoming primary coolant being circulated through the pressure tubes.

Yet another object of this invention is to provide a novel and more efficient superheating reactor in which pressure tubes are employed and each pressure tube converts a liquid coolant to a superheated vapor.

Still another object of this invention is to provide means for eliminating the differential expansion problems among the fuel elements of a fuel assembly contained within a pressure tube and between the inner and outer cladding of an annular fuel element.

Another object of this invention is to maintain a reactor pressure tube at as low a temperature as possible to minimize its thickness.

A further object is to minimize the heat loss from the exiting superheated vapor to the entering liquid coolant where such flows are adjacent one another.

Briefly, the present invention accomplishes the above cited objects by providing an integral boiling and superheating reactor of the "once through tube reactor" design (OTTR) comprising a separate moderator structure which in the example herein utilizes a solid moderator material and a re-entrant pressure tube design. The moderator, for example graphite, is contained in a low pressure tank. The pressure tubes, which contain both fissile fuel and primary coolant during reactor operation, are positioned vertically as viewed in the drawings and are uniformly spaced within the graphite moderator.

A liquid coolant enters each pressure tube and is heated continuously during a plurality of passes through the nuclear fuel assembly whereby the liquid coolant is converted to superheated steam. The nuclear fuel assembly contained within each pressure tube comprises a plurality of concentric annular fuel elements of fissionable fuel, such as $UO_2$, clad in metal such as stainless steel. The coolant passes alternately downwardly and upwardly among the fuel elements from the outer flow passage to the inner flow passage with the final superheating pass being upward in the center of the fuel assembly. Therefore, the cold liquid coolant is always adjacent the pressure tube wall, which is particularly important for tubes constructed of materials, such as zirconium alloys, which lack the high temperature strength of stainless steel. The superheated steam is then sent directly to the vapor utilizing means, such as a turbine generator for the production of electricity.

Since a fuel element can have drastically different inside and outside cladding temperatures, expansion joints are provided spaced at regular intervals in the outside cladding. Also, each fuel element is designed so that the weight of the fuel is supported in tension by the inside cladding.

In addition, a blanket of inert gas, for example helium, desirably is maintained within the low pressure reactor vessel containing the graphite moderator and pressure tubes. Since the graphite is operated in a hot condition (approximately 1200 to 1300° F.), substantially all of the moderator heat is transferred back to the pressure tubes where it is used to aid in the production of superheated steam. To facilitate the heat transfer from the graphite moderator to the primary coolant passing through the pressure tubes, the inert gas is circulated by a blower so as to transfer the heat by convection from the graphite to the gas and then from the gas to the pressure tube wall. In other applications of the invention, the heated helium can also be cooled in an external heat exchanger.

A thermal barrier is also provided between the entering liquid coolant and the exiting superheated vapor to minimize the heat flow therebetween where such flows are adjacent one another.

Further objects, features and advantages of the invention will become apparent as the following description proceeds wherein features of novelty, which characterize the invention, will be pointed out in particularity.

For a better understanding of the invention, reference may be had to the accompanying drawings, in which:

FIG. 3 is a vertical sectional view of the conduit arrangement shown in FIG. 2 and taken along reference line III—III thereof;

FIG. 6 is a simplified vertical sectional view with certain parts being in elevation of a re-entrant pressure tube assembly adapted for use in the reactor disclosed hereinafter;

FIG. 7 is an enlarged vertical sectional view of the pressure tube assembly shown in FIG. 6;

FIG. 8 is a cross-sectional view of the pressure tube assembly shown in FIG. 7 and taken along reference line VIII—VIII thereof;

FIG. 9 is a cross-sectional view of the pressure tube assembly shown in FIG. 7 and taken along reference line IX—IX thereof;

FIG. 10 is an enlarged vertical sectional view of a typical expansion joint and the lower end of a fuel element;

FIG. 11 is an enlarged view of an alternate method for removably supporting a fuel assembly and its extension from the pressure tube; and FIG. 12 is a vertical sectional view with parts in elevation of the upper portion of a pressure tube assembly illustrating still another method for removably supporting a fuel assembly and its extension from the pressure tube.

Figure 1:
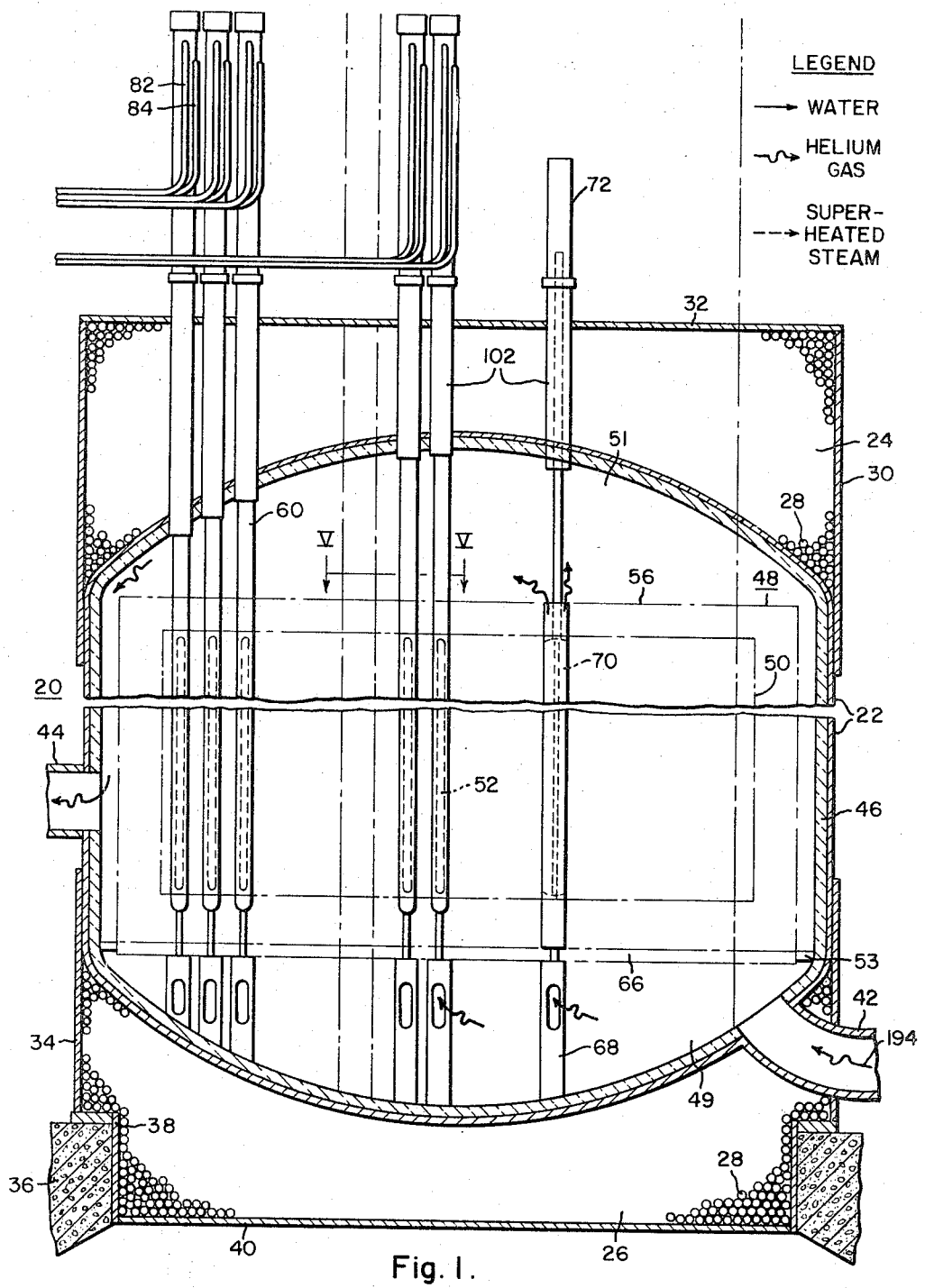
FIGURE 1 is a vertical section of a reactor with certain parts being in elevation.

Referring now to FIG. 1 of the drawings, an illustrative example of the direct cycle, integral boiling and superheating reactor 20 of the once through pressure tube type is depicted therein. A reactor vessel 22 is a vertical cylindrical tank equipped with an external upper biological shield 24 and a lower biological shield 26. The reactor vessel 22 is immersed in and cooled by the neutron shield tank water (not shown) which surrounds it. The upper and lower shields 24 and 26, respectively, comprise a combination of water and steel shot 28. The steel shot 28 in the upper shield 24 is contained by a cylindrically shaped shell 30, which serves as a reactor vessel extension and has its lower end welded to the reactor vessel 22. A circular cover plate 32, which rests on the reactor vessel extension 30, primarily serves to prevent dirt from getting into the upper shield 24 but can also be used as a support for pressure tube assemblies 60 and control rods 70 to be described hereinafter.

A lower vessel skirt 34, comprising a cylindrically shaped shell and having an annular ring welded to the lower end of the shell, is welded to the lower portion of the reactor vessel 22 and rests on a concrete foundation 36. A cylindrically shaped shell 38 for the lower shield is vertically positioned and has its upper end welded to the inner surface of the annular ring which forms part of the lower vessel skirt 34. A circularly shaped lower shield plate 40 is then positioned horizontally and welded to the lower end of the shell 38. The weight of the reactor vessel 22, all components within the reactor vessel 22, the upper shield 24, and the lower shield 26 is transmitted to the concrete foundation 36 through the lower vessel skirt 34 and shell 38. A gas inlet nozzle 42 is sealably secured to the bottom of the reactor vessel 22, and a gas outlet nozzle 44 is sealably secured to the side of the reactor vessel 22.

Thermal insulation 46 is provided for the entire inner surface of the reactor vessel 22 in order to reduce heat losses to the neutron shield tank water (not shown).

Figure 5:
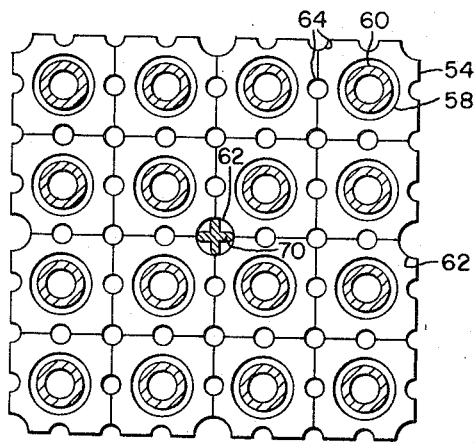
FIG. 5 is a partial cross-sectional view typical for the reactor core with certain parts removed for clarity and taken along reference line V—V of FIG. 1.

A graphite structure 48 contained within the reactor vessel 22 comprises a moderator and reflector region. Within the graphite structure a core, indicated by reference line 50, contains a plurality of fissile fuel assemblies 52. The graphite structure 48, in turn, comprises a plurality of graphite cells 54 (FIG. 5). That portion of the graphite cells contained within the core 50 comprises the moderator region. That portion of the graphite cells 54 surrounding the core 50 and enclosed by reference line 56 comprises the reflector region.

Turning now to FIG. 5, each graphite cell 54 passing through the core 50 is provided with a centrally bored passage 58 to receive a pressure tube assembly 60. A control rod passage 62 is formed by circular holes formed at the junction of four graphite cells 54. While the control rod passage 62 is shown as being cylindrical, it can also have some other shape, such as a cruciform shape in conformance with the shape of the control rod used. A plurality of bored holes 64 in the periphery of the graphite cells 54 permit additional flow of a cooling gas, such as helium, over the exterior of the graphite cells 54. Graphite cells 54 in the reflector region require holes primarily for cooling purposes. FIG. 5 also shows one control rod passage 62 for every four central passages 58. The graphite cells 54 are supported by a support structure 66 (FIG. 1) which in turn comprises a plurality of segmented plates 90 (FIG. 6) to be described hereinafter. Each segmented plate in turn is supported by an individual tubular support 68 (FIG. 6) also to be described hereinafter. A lower plenum chamber 49 comprises a space between the bottom of the reactor vessel 22 and the support structure 66 for the graphite. An upper plenum chamber 51 comprises a space between the top of the reactor vessel 22 and the top of the graphite structure 48. An annular baffle 53 (FIG. 1) is fastened to the periphery of the support structure 66 and butts against the inside of the insulation 46 in order to prevent the helium which enters the reactor vessel 22 from bypassing core 50. Thus, the helium enters the reactor vessel 22 through gas inlet nozzle 42, flows upwardly through the core 50 and the graphite structure 48 into the upper plenum chamber 51, and then exits through the gas outlet nozzle 44.

Referring now to FIGS 1 to 4, there is shown a conduit arrangement permitting an inlet and outlet conduit to be run to each pressure tube assembly 60 while still leaving space on top of the reactor 20 for control rods 70.

In this example of the invention the control rods 70 penetrate only the top of the reactor vessel 22 and are located between every other row of pressure tube assemblies 60. Furthermore, the pressure tube assembly 60 is of a re-entrant design and, therefore, the bottom face of the reactor vessel 22 is also completely accessible for control rod drives. However, in this invention the control rod drives 72 are located above the reactor 20. The control rod drive 72 is a standard motor driven type, such as a rack and pinion or drum and cable. The entire driving mechanism is contained in a sealed metal can to prevent leakage of an inert gas, such as helium, used for cooling the graphite cells 54. This design permits the use of an inexpensive control rod drive mechanism 72 and requires no shaft seals. The control rod 70 is made of a neutron absorbing material such as boron with a suitable cladding such as steel.

Figure 2:
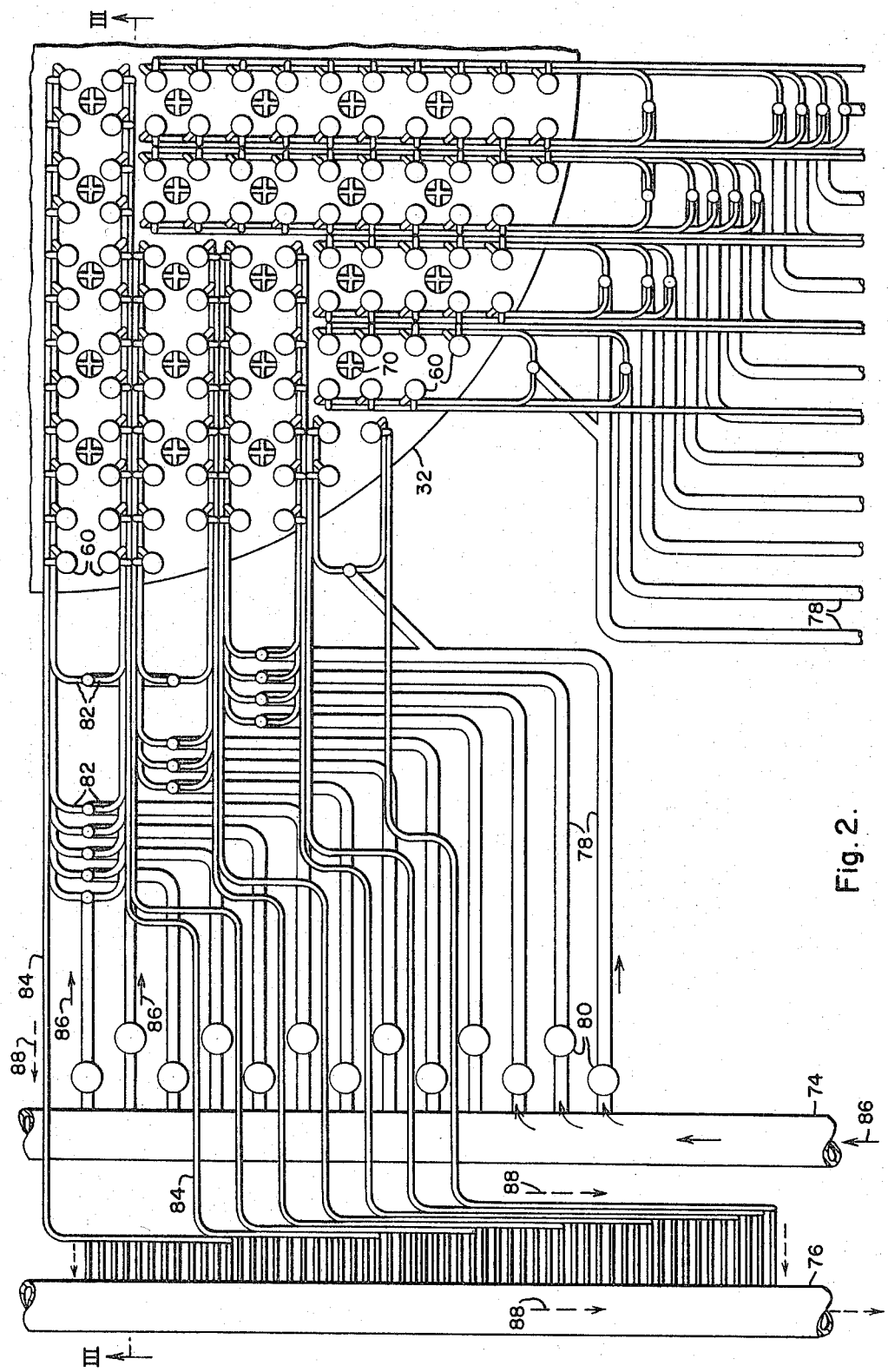
FIG. 2 is a top plan view of a quarter of the reactor showing the conduit arrangement from the headers to the pressure tube assemblies with parts removed to show the control rods.

Referring now particularly to FIGS. 2 and 3 of the drawings, there is shown a liquid header 74 and a superheated vapor header 76. From the liquid header 74 a plurality of common inlet conduits 78 are run towards the reactor 20. In each of the common inlet conduits 78 there is installed a throttling flow control valve 80, which is remotely operated. It is desirable to reduce the number of valves 80 that are utilized in the system. Accordingly, the pressure tube assemblies 60 are divided into groups of four or more (usually around a control rod 70 where flux patterns will be similar) and are supplied by a single control valve 80. This is accomplished by having individual inlet conduits 82 coupling communicatively each common inlet conduit 78 with at least four pressure tube assemblies 60. On the other hand an individual outlet conduit 84 couples communicatively the outlet of each pressure tube assembly 60 with the superheated vapor header 76. To further clarify the flow circuitry of this invention, the inlet liquid flow is indicated on the drawings by a solid line flow arrow 86, and the outlet superheated vapor flow is indicated by dotted line flow arrow 88.

Figure 4:
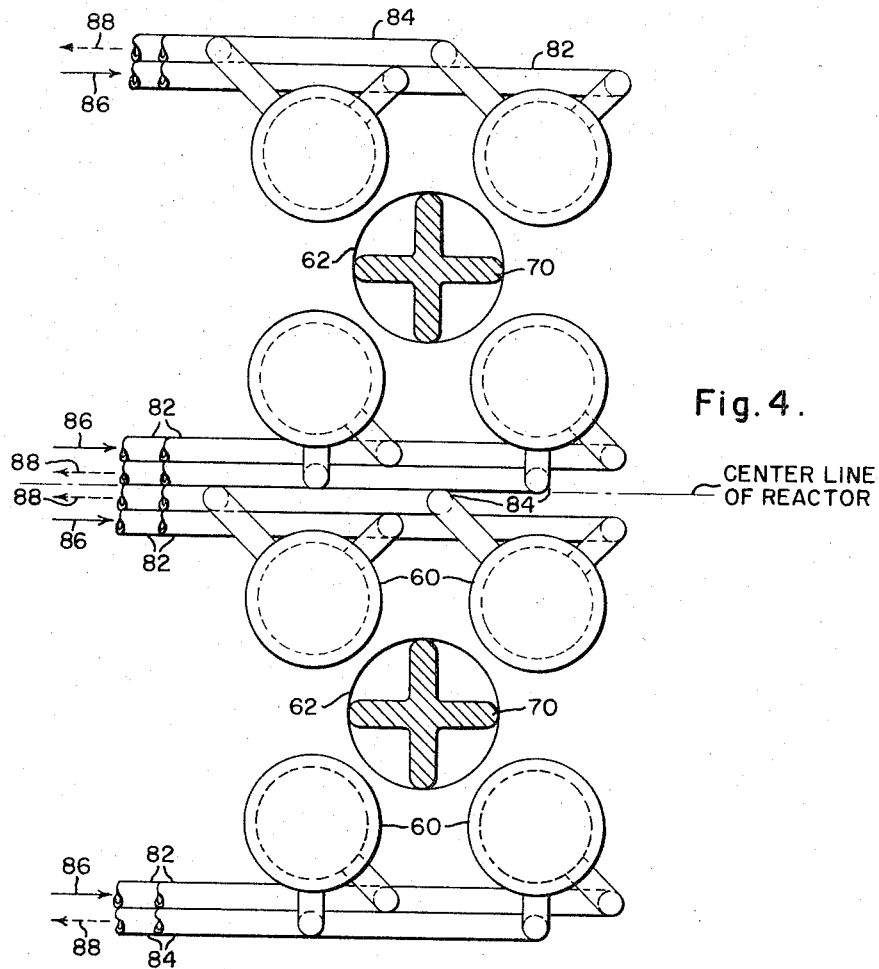
FIG. 4 is an enlarged plan view taken on either side of the centerline of the reactor to show details of the conduit arrangement with greater clarity and taken along reference line IV—IV of FIG. 3 with certain parts removed.

Referring now specifically to FIG. 4 of the drawings, there is shown in greater detail the arrangement of control rods 70 between alternate rows of pressure tube assemblies 60 with conduits 82 and 84 being located in the adjoining rows not occupied by the control rods 70. Also shown are the individual inlet conduits 82 adjacent the pressure tube assemblies 60 with the individual outlet conduits 84 being adjacent the individual inlet conduits 82 on the side opposite of the pressure tube assembly 60. The conduit arrangement as described above is also provided with adequate flexibility to take care of thermal expansion. It can thus be readily seen from the conduit arrangement, as described and shown on the drawings, that the pressure tube assemblies 60, the conduits 82 and 84, the control rods 70, and the control rods drive 72 can all be replaced and repaired without drastically dismembering the reactor 20.

Referring now to FIG. 6, there is shown a typical arrangement for a re-entrant pressure tube assembly 60 which is exemplary of the plurality of re-entrant pressure tube assemblies 60 constituting a part of the reactor 20. Each tubular support 68 extends from the torispherical bottom head of the reactor vessel 22 vertically to a squarely shaped plate 90, which is located adjacent to and in the same horizontal plane as the previously described annular baffle 53 (FIG. 1). The plates 90 form the previously mentioned support structure 66. The tubular support 68 is welded to the bottom of the reactor vessel 22 and is also welded to the square plate 90. The tubular support 68 also has a plurality of elongated openings 92 which permit passage of helium from the lower plenum chamber 49 to the inside of the tubular support 68. An annular ring 94, which is vertically above and directly in line with the tubular support 68, is placed on top of the square plate 90 and welded thereto. The graphite cell 54, which has an offset annular space at its lower end formed so as to fit over the annular ring 94, is then vertically positioned and supported by the square plate 90. The annular ring 94 serves as a guide to hold a graphite cell 54 in a fixed lateral position.

Positioned coaxially within the graphite cell 54 is the pressure tube assembly 60, which forms an annular gap 95 between the assembly 60 and the graphite cell 54 to permit the flow of helium therebetween. The pressure tube assembly 60 extends from a point a short distance above the square plate 90 to a point above the cover plate 92. The bottom of the pressure tube assembly 60 is welded a cylindrically shaped guide pin 96, which extends downwardly through a hole 98 formed in the center of the square plate 90. The guide pin 96 extends downwardly only a short distance below the square plate 90 and serves as a guide to maintain the lateral position of the pressure tube assembly 60 relative to the graphite moderator cell 54. The square plate 90 also contains a plurality of holes 100, which permit the flow of helium from inside the tubular support 68 to the annular gap 95.

Also provided for each of the pressure tube assemblies 60 is a flanged sleeve 102 which passes through the upper biological shield 24 from a distance shortly below the insulation 46 to a point a short distance above the cover plate 32. Sleeve 102 is sealably secured to the top of the reactor vessel 22 and can be slidably, fixedly, or sealably secured to the cover plate 32. In this example, sleeve 102 slidably passes through the cover plate 32 and is supported by the reactor vessel 22. The pressure tube assembly 60 is sealably supported by the sleeve 102 through a flanged gasketed joint 104. Therefore, the pressure tube assembly 60 can be removed individually from the reactor 20 merely by unbolting the flanged joint 104.

Referring now to FIGS. 7 to 10 of the drawings and in particular to FIG. 7, the details of a pressure tube assembly 60 are depicted therein. The pressure tube assembly 60 comprises a pressure tube 106 of the re-entrant type, a fuel assembly 52 located coaxially within the lower portion of the pressure tube 106, and a fuel assembly extension 108 located in the upper portion of the pressure tube 106.

The re-entrant pressure tube 106 forms the outer shell of the pressure tube assembly 60. The upper end of the pressure tube 106 is open, but the open end is sealably closed by inserting a plug 110 into the open end and welding the plug 110 to the pressure tube 106. The plug 110 is used to prevent radiation streaming in an upwardly direction from the fuel assembly 52 in addition to sealing the high pressure steam coolant. A vapor outlet nozzle 112 forms an integral part of the pressure tube 106 and is located a short distance below the plug 110. A liquid inlet nozzle 114 also forms an integral part of the pressure tube 106 and is located a short distance below the outlet nozzle 112. A flange 116 is located below the inlet nozzle 114 and is sealable secured to the pressure tube 106. The flange 116 forms the upper portion of the gasketed flange joint 104 referred to above and is located adjacent the upper portion of the pressure tube 106. The lower end of the pressure tube 106 is sealed by a hemispherically shaped cap 118, and to the bottom of the cap 118 is welded the guide pin 96 which serves as a guide to maintain the lateral position of the pressure tube assembly.

Positioned coaxially within the upper portion of the pressure tube 106 is the fuel assembly extension 108, which comprises an outer tube 120 and an inner tube 122. Flanges 124 and 126 are formed at the upper end of tubes 120 and 122, respectively. Flange 124 extends radially to the pressure tube 106 and is sealably secured thereto as by welding. Flange 126 extends radially to outer tube 120 and moves slidably therein in order to provide for the differential expansion that will occur between tubes 120 and 122, because of the fact that the inlet liquid that passes over the outer tube 120 has a much lower temperature than the superheated vapor that flows through the inner tube 122. The fuel assembly 52 is then secured, sealably if desired, to the bottom of the fuel assembly extension 108 in a manner to be described hereinafter. As shown in FIG. 7, the flanges 124 and 126 are located between the vapor outlet nozzle 112 and the liquid inlet nozzle 114.

In this example of the invention, outer tube 120 is fixedly secured, and sealably if desired, to the fuel assembly 52 by welding as shown at 130. The lower end of the inner tube 122 is offset so as to fit slidably into the upper opening 132 of the fuel assembly 52. Inner tube 122 can also be sealably welded at 134 to the top of fuel assembly 52, if it is desired to do so. Therefore, in this example of the invention outer tube 120 supports fuel assembly 52, which in turn supports inner tube 122. Also, it can readily be seen from FIG. 7 that fuel assembly extension 108 and fuel assembly 52 can be removed as unit from within the pressure tube 106 by merely cutting weld 128 at the top of the fuel assembly extension 108.

Shown in FIG. 11 is another method for removably supporting the fuel assembly extension 108 and the fuel assembly 52. In this modification, an annular ring 136 is sealably welded to the inside of the pressure tube 106. The flange 124 of outer tube 120 is then supported by the ring 136 with a gasket 138 being placed therebetween to prevent leakage between the inlet and outlet nozzles 114 and 112, respectively, of the pressure tube assembly 60. In this instance, the weight of the fuel assembly extension 108 and the fuel assembly 52 is utilized to compress the gasket 138 so as to prevent any leakage between the ring 136 and the flange 124. To further insure the prevention of any leakage between the ring 136 and the flange 124, a nut 140 can be used to secure the flange 124 to the ring 136 by means of internal threads 141 on pressure tube 106.

Shown in FIG. 12 is still another modification for removably supporting a fuel assembly extension 108'. At the upper end of the extension 108' there is formed a fuel lift grab groove 131 and an inclined surface 133 on the inner and outer peripheries, respectively, of the extension. The surface 133 engages seat 135 formed on the pressure tube 106' so as to create a seal, such as a metal to metal contact, in order to prevent a mixing of the liquid coolant entering inlet nozzle 144 (FIG. 7) and the superheated vapor leaving through outlet nozzle 112.

Bearing down on top of extension 108' is a bottom plug 137, which is forced downwardly by spring 139. Plug 137 also communicatively couples an exit flow passage 146, to be described hereinafter, with outlet nozzle 112. Above bottom plug 137 is an intermediate plug 143, which contains spring 139. A retaining ring 145 is secured to the lower, inner periphery of plug 143, with ring 145 being located spacedly below and overlapping a lip 147 formed at the top of bottom plug 137. Thus spring 139 can force plug 137 downwardly. A lip 157 is also formed at the top of intermediate plug for removal purposes. A top plug 159 forms a gasketed joint 161 with pressure tube 106', and a cap 163 forces the top plug 159 in a downward direction. The top plug 159 then bears against the intermediate plug 143 which is forced upwardly by spring 139.

In order to remove the fuel assembly 52 (FIG. 7) secured to the bottom of fuel assembly extension 108', the cap 163 and top plug 159 are removed from pressure tube 106'. A plug removal tool (not shown) is then used to engage lip 157 and pull intermediate plug 143 in an upward direction. Retaining ring 145 then engages lip 147 pulling bottom plug 137 upwardly out of pressure tube 106'. A fuel removal tool (not shown) is then used to engage fuel lift grab groove 131 in the upper portion of fuel assembly extension 108' to remove as a unit both the extension 108' and the fuel assembly 52 (FIG. 7) secured to the bottom of extension 108'.

Returning now to FIGS. 7 through 10 of the drawings, an annular inlet flow passage 142 is formed between outer tube 120 and the pressure tube 106. Within inner tube 122 is formed the exit flow passage 146. An annular gap 144 is formed between inner tube 122 and outer tube 120 which serves as a thermal barrier between inlet and exit flow passages 142 and 146, respectively. An annular gap 149, formed in end support 148, also serves as a thermal barrier similar to the gap 144 extending above it.

As stated previously, the fuel assembly 52 is supported by the fuel assembly extension 108. The fuel assembly 52 comprises the annular end support 148 to which outer tube 120 and inner tube 122 are welded, a plurality of annular fuel elements 150a, 150b, 150c, 150d and a discoidal flow reversing block 152. In this example there are four concentric annular fuel elements 150 which are coaxially and substantially coextensively located with respect to one another in spaced relation.

Each of the fuel elements 150 comprises an inner cladding 151 (FIG. 10) an outer cladding 153, a top end annular cap 154 sealably secured to the ends of the cladding 151 and 153 as by welding, a bottom end annular cap 156 sealably secured to the claddings 151 and 153 as by welding, and fissile fuel material 158 contained within the annulus formed by end caps 154 and 156 and claddings 151 and 153. By fissile it is meant that the fuel material is inclusive of either fertile or fissionable material or both, and by fertile it is meant that the fuel material is subject to transformation into a fissionable material. End caps 154a and 154c have offsets in their upper portion which interfit with end support 148 and are secured thereto as by welding at 160 and 162 respectively. End cap 154b has three internally threaded extensions 164 into which bolts 166 are threaded in order to secure end cap 154b to end support 148. End cap 154d has three support lugs 168 integrally formed at the top thereof. Support lugs 168 rest on the top of end caps 154c and are located between the top of end cap 154c and an inwardly extending lip 170 formed on end support 148. Spacing lugs 172 are integrally formed on the side of end caps 156a, 156c and 156d. The spacing lugs 172 keep the fuel elements 150 spaced from one another at their lower end.

As will be described later in greater detail, the temperature of the coolant flowing past the outer cladding 153 (FIG. 10) is considerably less than the temperature of coolant flowing past the inner cladding 151. Therefore, since the fuel element in this example is 16 feet long and the claddings 151 and 153 will attain different temperatures, it may be necessary to provide an expansion joint 174 spaced at regular intervals in the outside cladding 153 of the fuel elements 150a, 150b, and 150c. In the case of fuel element 150d the temperature of the coolant passing over both the inner and outer cladding is the same; therefore, no expansion joints 174 are required in the outer cladding. This will become readily apparent when the flow circuit for the coolant through the pressure tube assembly 60 is explained. To aid in the expansion of the outer cladding 153 there are enclosed two annular spacers 176 between the claddings 151 and 153, with one spacer being located on either side of the expansion joint 174. Each spacer 176 also has a rounded portion in order to permit the expansion joint to function more easily.

Referring now to fuel element 150b, bottom end cap 156b is a solid annular ring which interfits with the flow reversing block 152. The flow reversing block 152 is sealably secured to the bottom of end cap 156b by means of bolts 178 which are threaded into the end cap 156b. A gasket (not shown) may be used between the mating surfaces of the end cap 156b and the reversing block 152 in order to prevent any leakage therebetween, if required.

The annulus bottom surface 180 of end support 148 and annular top surfaces 182 and 184 of flow reversing block 152 are U-shaped in section in order to aid in the reversal of coolant flow within the fuel assembly 52. End caps 154b, 156a, 156c, and 156d also have semi-circularly shaped ends in section in order to aid in the reversal of coolant flow within the fuel assembly 52.

The fuel elements 150 are further subdivided as to nomenclature from the outermost fuel element to the innermost fuel element as follows in order to describe the flow passages within fuel assembly 52: outer fuel element 150a, first intermediate fuel element 150b, second intermediate fuel element 150c, and central fuel element 150d. The flow passage formed between pressure tube 106 and outer fuel element 150a is a continuation of the annular inlet flow passage 142 previously described in connection with the fuel assembly extension 108 and pressure tube 106. A first intermediate flow passage 186 is formed between the outer fuel element 150a and the first intermediate fuel element 150b. A second intermediate flow passage 188 is formed between the first intermediate fuel element 150b and the second intermediate fuel element 150c. An annular outlet flow passage 190 is formed between the second intermediate fuel element 150c and the central fuel element 150d. A central outlet flow passage 192 is contained within the central fuel element 150d. All of the aforementioned flow passages, except the central flow passage 192, are annularly shaped in conformance with the annular fuel elements 150 forming the flow passages.

The inlet flow passage 142 extends from the inlet nozzle 114 to the lower portion of the pressure tube 106. The first intermediate flow passage 186 communicates with the inlet flow passage 142 at the lower end of outer fuel element 150a and communicates with the second intermediate flow passage 188 at the upper end of the first intermediate fuel element 150b. The second intermediate flow passage 188 then communicates simultaneously with both the annular outlet flow passage 190 and the central outlet flow passage 192 at the lower end of the second intermediate fuel element 150c and the central fuel element 150d. The annular and central outlet flow passages 190 and 192, respectively, are longitudinally in alignment and communicate simultaneously with the exit flow passage 146, which in turn communicates with the vapor outlet nozzle 112.

The control rod 70 is also inserted through the flange sleeve 102 and the graphite cell 54 in manner similar to that previously described for the pressure tube assembly 60 shown in FIG. 6, except that the diameter required for the insertion of the control rod 70 may be different. The graphite supporting structure, such as tubular support 68 and square plate 90 are also similar to that previously described in FIG. 6 and includes openings 92 and holes 100. It is to be understood, however, that the path through which the control rod 70 travels can also have a cruciform shape in lieu of a circular shape as described hereinbefore.

The following summary of plant design, including a tabulation of plant and reactor characteristics and of materials of construction, is presented as a guide to the construction of a reactor plant embodying the present invention with the obvious intent that the summary is merely exemplary of an illustrative application of the invention and not limitative thereof. Obviously, differing characteristics and materials can be selected by the nuclear engineer upon the basis of readily available technology, when constructing a nuclear plant having a differing power rating.

*Table I.—Summary of plant design*

Power ratings:
    Reactor heat output _____ 570 mw.
    Plant heat loss (1%) _____ 6 mw.
    Electric generator output _____ 209 mw.
    Auxiliary electric loads _____ 9 mw.
    Plant net electric output _____ 200 mw.
    Turbine cycle efficiency _____ 37%.
    Plant overall efficiency _____ 35%.
Coolant conditions:
    Steam flow _____ 1,850,00 lbs./hr.
    Turbine throttle pressure _____ 800 p.s.i.g.
    Turbine throttle temperature _____ 950° F.
    Feedwater inlet pressure _____ 1050 p.s.i.g.
    Feedwater inlet temperature _____ 450° F.
    Core temperature rise ($\Delta T$) _____ 500° F.
    Core enthalpy rise ($\Delta h$) _____ 1052 B.t.u./lb.
Reactor:
    Container tank height _____ 32 ft., 2 in.
    Container tank outside diameter __ 26 ft., 10 in.
    Container tank wall thickness ____ 7/8 in.
    Container tank wall material _____ SA 212, GDB Steel.
    Container tank design conditions _ 650° F. 100 p.s.i.g.
    Container tank gas _____ 50–80 p.s.i.g. helium.
    Graphite cylinder height _____ 20 ft., 0 in.
    Graphite cylinder diameter _____ 25 ft., 0 in.
    Graphite reflector thickness _____ 2 ft.
    Graphite moderator temperature range _____ 900–1300° F.
    Graphite moderator average temperature _____ 1100–1200° F.
    Pressure tube lattice (square pitch) 10 3/8 in.
    Number of pressure tubes _____ 448.
    Pressure tube design conditions __ 1100 p.s.i.g. 650° F.
    Pressure tube material _____ Zircaloy 2.
    Pressure tube outside diameter ___ 4.15 in.
    Pressure tube inside diameter ____ 3.60 in.
    Pressure tube wall thickness _____ .275 in.
    Number of fuel elements/assembly _ 4.
    Fuel element dimensions:
        150a _____ 3.46 in. O.D. x 300 in. I.D.
        150b _____ 2.64 in. O.D. x 2.22 in. I.D.
        150c _____ 1.74 in. O.D. x 1.28 in. I.D.
        150d _____ .90 in. O.D. x .40 in. I.D.
    Fuel element cladding [1] _____ .015 in. 304 s.s.
    Fuel element length _____ 16 ft.
    Weight of $UO_2$/assembly _____ 335 lbs.
    Weight of $UO_2$ core total _____ 150,000 lbs.
    $U_{235}$ enrichment _____ 1.88%.
    Moderator/U volume ratio _____ 40/1.
    Number control rods _____ 68.
    Control rod type _____ 8 in. cruciform.
    Control rod material _____ Boron–s.s.
    Core heat transfer surface _____ 29,360 ft.$^2$.
    Core average heat flux _____ 66,300 B.t.u./hr. ft.$^2$.
    Core maximum heat flux _____ 202,000 B.t.u./hr. ft.$^2$.
    Ratio maximum/average heat flux __ 3.05/1.
    Core maximum surface temperature _____ 1050° F.

[1] The cladding thickness of 15 mils is based on the assumption that it will be pressure-collapsed onto the $UO_2$ fuel. Each fuel element is designed so that its weight is supported in tension by the inner cladding 151.

*Operation of once through tube reactor (OTTR)*

Referring now to FIGS. 1, 2, 4, 6, and 7 of the drawings, an operational explanation of OTTR will be given. To aid in the understanding of the flow circuit a legend has been established as shown in FIG. 1; wherein, water is indicated by solid line flow arrow, superheated steam is indicated by a broken line flow arrow, and helium gas is indicated with a solid line flow arrow with a single wave in the line.

A feedwater pump (not shown) pumps a liquid coolant, such as water, into the liquid header 74 as shown by flow arrow 86. The water then flows through a plurality of common inlet conduits 78. The flow through each conduit 78 is controlled by a throttling control valve 80. Each of the common inlet conduits 78 feeds a plurality of individual inlet conduits 82, with the usual number being four. Each individual inlet conduit 82, in turn, feeds a single pressure tube assembly 60, with the conduit 82 being sealably coupled to liquid inlet nozzle 114 (FIG. 7). As stated previously, the pressure tube assemblies 60 are normally divided into groups of four around a control rod (where flux patterns will be similar) and are supplied by a single throttling control valve 80. As specifically shown in FIG. 4, the individual inlet conduits 82 are nested together between the pressure tube assemblies 60 and the individual outlet conduits 84.

Referring now specifically to FIG. 7, the water flows downwardly through the inlet flow passage 142, during which time it absorbs heat from the graphite moderator surrounding the pressure tube assembly 60 in a manner to be described hereinafter and also from the outer fuel element 150a. The water then makes three additional passes through the fuel assembly 52, with the flow path through the fuel assembly 52 being indicated by arrowheads. Specifically, the water flow is downward through inlet flow passage 142, reverses its flow around the bottom of outer fuel element 150a, flows upwardly through the first intermediate flow passage 186, reverses its flow around the top of the first intermediate fuel element 150b, flows downwardly through the second intermediate flow passage 188, reverses its flow around the bottom of the second intermediate fuel element 150c and the central fuel element 150d, simultaneously flows upwardly through the annular outlet flow passage 190 and the central outlet flow passage 192, and then leaves the fuel assembly 52 and continues to flow upwardly through the exit flow passage 146. The superheated steam then leaves the pressure tube assembly 60 through vapor outlet nozzle 112 which is sealably secured to the individual outlet conduit 84. As the water makes its plurality of passes through the fuel assembly 52, the water absorbs heat from the individual fuel elements 150 and is changed from water to superheated steam.

The superheated steam then flows through the individual outlet conduits 84 into the superheated vapor header 76 as indicated by flow arrows 88. From the header 76 the superheated steam then flows to external utilizing means (not shown), such as a turbine generator for producing electricity or to be used as process steam or for heating purposes.

Referring now particularly to FIGS. 1 and 6 of the drawings the inert gas, such as helium, is used as a heat transfer medium to transfer heat from the graphite cells 54 to the pressure tube assembly 60. The helium enters the reactor 20, as indicated by a single wave solid line flow arrow 194. The helium then makes a single upward pass inside the reactor 20 through the annular gaps 95 between the graphite cells 54 and the pressure tube assemblies 60, between the graphite cells 54 and the control rods 70, and through the holes 64 (FIG. 5) formed between the graphite cells 54. As the helium flows upwardly through gap 95, it transfers heat from the graphite cells 54 to the pressure tube assembly 60. As the helium flows upwardly past the control rods 70 and through the holes 64, the helium blankets and cools the graphite cells 54 and the control rods 70. This is necessary to (1) prevent oxidation of the graphite at high temperatures (2) limit control rod temperature (3) maintain peak graphite temperatures below the temperature at which a carbon-steam reaction could be significant in the event of a pressure tube rupture and (4) limit the total thermal capacity of the graphite mass. The helium upon leaving the upper end of the graphite mass flows downwardly around the internal periphery of the reactor 20 and flows from the reactor 20 through the gas outlet nozzle 44. If necessary, the helium gives up any excess heat which it may have absorbed during its flow through the reactor 20 by means of a standard heat exchange system (not shown) with the incoming water coolant. After the helium has been sufficiently cooled, it is returned to the reactor 20 and again enters therein through the gas inlet nozzle 42 and repeats the cycle explained above.

While there have been shown and described what are at present considered to be the preferred embodiments of the invention, modifications thereto will readily occur to those skilled in the art. For example, in the fuel assembly extension 108 the thermal barrier may be eliminated and only a single flange tube may be used in lieu of the outer tube 120 and the inner tube 122 described in this invention. It is also possible to remove the central fuel element 150d from the fuel assembly 52, which will then result in a reduced coolant pressure drop through the fuel assembly 52 and will also simplify the construction of fuel assembly 52. Another possible change is the use of a liquid moderator in lieu of the graphite moderator. Yet another change is having the inlet aperture at one end of the pressure tube assembly and the outlet aperture at the other end of the pressure tube assembly. It is not desired therefore, that the invention be limited to the specific arrangements shown and described. However, it is intended to cover in the appended claims all such modifications as fall within the true spirit and scope of the invention.

What is claimed is:

1. In a neutronic reactor, an outer vessel, a solid moderator lattice disposed in said vessel and forming a plurality of flow openings therethrough, a re-entrant pressure tube assembly disposed in each of said openings and having a portion thereof passing through said outer vessel, means for circulating a liquid coolant through each of said pressure tube assemblies, fissionable material disposed within each of said pressure tube assemblies in a heat exchange relationship with said liquid coolant, means for producing superheated vapor within each of said pressure tube assemblies, and means for circulating a cooling fluid through said vessel in intimate contact with said moderator lattice and with the exterior surfaces of said pressure tube assemblies to promote heat transfer from said moderator lattice to said pressure tube assemblies.

2. In a neutronic reactor of the pressure tube assembly type the combination comprising an outer vessel, a moderator lattice supported within said vessel and having a plurality of openings extending therethrough, a plurality of upstanding pressure tube assemblies extending in a generally parallel spaced array through those lattice openings and through a wall of said vessel, each of said pressure tube assemblies being re-entrant and arranged to pass through said outer vessel only once, means for circulating a liquid coolant through each of said pressure tube assemblies, fissile material disposed in heat exchange relationship with said liquid coolant within each of said pressure tube assemblies, and said fissile material being disposed in a plurality of coextending spaced cylinders within each of said pressure tube assemblies through which the coolant makes a plurality of passes in a heat exchanging relationship with said fissile material, and there being sufficient fissile material for producing a superheated vapor from said liquid coolant within each of said pressure tube assemblies.

3. A pressure tube assembly type neutronic reactor comprising an outer vessel, a solid moderator lattice supported within said vessel and having a plurality of openings extending therethrough, a plurality of pressure tube assemblies extending in a generally parallel spaced array through some of said lattice openings, a plurality of control rods extending in a generally parallel spaced array through the remainder of said lattice openings, a plurality of said pressure tube assemblies grouped around each of said control rods, separate coolant flow control means for each group of said pressure tube assemblies located adjacent said same control rod, an inlet conduit to each of said pressure tube assemblies for supplying a liquid coolant to said pressure tube assemblies, sufficient fissionable means for producing a superheated vapor within each of said pressure tube assemblies from said liquid coolant, and an outlet conduit from each of said pressure tube assemblies for removing the superheated vapor produced in said pressure tube assemblies, said inlet and outlet conduits nested together between some of said pressure tube assemblies and said control rods located between the remainder of said pressure tube assemblies.

4. The combination in claim 3 wherein said fissionable means comprises a plurality of coextending annular fuel elements within each of said pressure tube assemblies through which the coolant makes a plurality of passes in a heat exchanging relationship with said fuel elements.

5. A pressure tube assembly type neutronic reactor comprising an outer vessel, a solid moderator lattice supported within said vessel and having a plurality of openings extending therethrough, a plurality of upstanding individually removable pressure tube assemblies extending in a uniformly parallel spaced array into some of said lattice openings, each of said pressure tube assemblies being re-entrant and arranged to pass through said outer vessel only once, a plurality of upstanding control rods extending in a uniformly parallel spaced array through the remainder of said lattice openings, at least four of said pressure tube assemblies grouped around each of said control rods, separate coolant flow control means for each group of said pressure tube assemblies located adjacent said same control rod, an inlet conduit to each of said pressure tube assemblies for supplying a liquid coolant to said pressure tube assemblies, sufficient fissionable means for producing a superheated vapor within each of said pressure tube assemblies from said liquid coolant, said fissionable means comprising a plurality of coextending annular fuel elements within each of said pressure tube assemblies through which the coolant makes at least three passes in a heat exchanging relationship with said fuel elements, an outlet conduit from each of said pressure tube assemblies for removing the superheated vapor produced in said pressure tube assemblies, said inlet and outlet conduits nested together between some of said pressure tube assemblies, said control rods located between the remainder of said pressure tube assemblies, and means for circulating a cooling fluid through said vessel in intimate contact with said moderator lattice and with the exterior surfaces of said pressure tube assemblies to promote heat transfer from said moderator lattice to said pressure tube assemblies.

6. A pressure tube assembly for a neutronic reactor comprising an elongated pressure tube having an inlet aperture and an outlet aperture, a liquid coolant entering said inlet aperture, means for forming at least four reverse flow passages communicating serially with one another and with said inlet and outlet apertures, said flow passages comprising an outermost flow passage and an innermost flow passage, a portion of said outermost flow passage being an inlet flow passage coupling said inlet aperture to said outermost flow passage, an exit flow passage coupling said innermost flow passage to said outlet aperture, means for forming a thermal barrier between said inlet flow passage and said exit flow passage, and said flow passage forming means having sufficient fissile fuel material adjacent each of said flow passages for converting substantially all of said liquid coolant to a superheated vapor, said superheated vapor exiting through said outlet aperture.

7. The combination of claim 6 wherein said inlet and outlet apertures are adjacent one end of said tube, and said exit flow passage is coaxially adjacent to and laterally sealed from said inlet flow passage, and wherein said flow passages are annular and coaxial.

8. A pressure tube assembly for a neutronic reactor comprising an elongated pressure tube having an inlet aperture and an outlet aperture, a plurality of spaced annular fissile fuel elements located coaxially within said pressure tube, said fuel elements forming a plurality of reverse flow passages communicating serially with one another and with said inlet and outlet apertures so as to provide a continuous flow path from said inlet aperture to said outlet aperture for a coolant flowing from said inlet aperture, said annular fuel elements being to said outlet aperture in a heat exchanging relationship with the coolant and having sufficient fissile fuel material adjacent each of said flow passages to convert the coolant from a liquid to a superheated vapor by the absorption of heat from said fuel elements during the passage of said coolant through said flow passages.

9. The combination of claim 8 wherein said fuel elements extend coextensively with one another, and said flow passages include an outer flow passage communicating with said inlet aperture and an inner flow passage communicating with said outer aperture.

10. The combination according to claim 8 wherein each of said fuel elements comprises an inner cladding, an outer cladding disposed outwardly of said inner cladding, fissile fuel material therebetween, an end cap at each end of said fuel element sealably enclosing said fuel material within said claddings, at least one longitudinal expansion joint in one of said claddings to provide for differential expansion between said inner and outer claddings.

11. The combination according to claim 10 including means for providing differential expansion among said fuel elements, and wherein said cladding having said longitudinal expansion joint is the cladding first to contact said coolant.

12. The combination according to claim 11 wherein said inlet and outlet apertures are adjacent one end of said tube and including an annular spacer on each side of said expansion joint extending radially from one of said claddings to the other of said claddings, and including means adjacent the ends of said fuel elements for reversing the flow of coolant from one flow passage to another.

13. A pressure tube assembly vertically insertable into a neutronic reactor comprising an elongated pressure tube having an inlet aperture and an outlet aperture formed in the upper portion of said pressure tube, said outlet aperture being above said inlet aperture, a tubular fuel assembly extension coaxially positioned within the upper portion of said pressure tube and annularly spaced therefrom to form a pair of passages communicating with said apertures, respectively, said upper end of said extension being sealably secured to the inner wall of said pressure tube at a point between said inlet and outlet apertures, a fuel assembly coaxially positioned within the lower portion of said pressure tube and supported by the lower end of said extension, said fuel assembly comprising a plurality of annular fissile fuel elements forming a plurality of serially communicating flow passages therebetween, and a coolant flowing from said inlet aperture to said outlet aperture through said extension passages and in heat exchanging relationship with said annular fuel elements, said coolant being changed from a liquid to a superheated vapor by the absorption of heat from said fuel elements during the passage of said coolant through said flow passages.

14. The combination in claim 13 wherein said fuel assembly extension and said fuel assembly are removable as a unit from said pressure tube, form an outer flow passage with said pressure tube, and contain an inner flow passage; said fuel assembly being sealably supported by the lower end of said extension; and the coolant flowing from said inlet aperture through said outer flow passage, through said flow passages in said fuel assembly, and through said inner flow passage to said outlet aperture.

15. A pressure tube assembly for a neutronic reactor comprising an elongated pressure tube having one end closed and the other end open and capable of containing a mass of nuclear fissile fuel material; a plug sealably secured to said open end of said pressure tube; a plurality of annular fissile fuel elements located coaxially within said pressure tube and extending coextensively with one another, said fuel elements forming a plurality of flow passages therein including an inner and an outer flow passage, and said flow passages communicating serially with one another so as to provide a continuous flow path from said outer flow passage to said inner flow passage; a coolant flowing from said outer flow passage to the inner flow passage in a heat exchanging relationship with said annular fuel elements, said coolant being changed from a liquid to a superheated vapor before exiting from said inner flow passage by the absorption of heat from said annular fuel elements during the passage of said coolant through said flow passages; each of said fuel elements comprising an inner cladding, an outer cladding disposed outwardly of said inner cladding, fissile fuel material therebetween, a cap at each end of said fuel element sealably enclosing said fuel material within said claddings, at least one longitudinal expansion joint in said outer cladding, an annular spacer on each side of said expansion joint extending radially from said inner cladding to said outer cladding, said spacer having a snug fit with said inner and outer claddings; an outlet aperture formed in the wall of said pressure tube adjacent said plug; an inlet aperture formed in the wall of said pressure tube between said fuel elements and said outlet aperture; an inner tube extending longitudinally from said inner passage and coaxially with said pressure tube to a point between said inlet and outlet apertures and communicating with said inner passage; and an outer tube coaxially disposed between said inner tube and said pressure tube and extending longitudinally from said outer passage to a point coextensive with said inner tube between said inlet and outlet apertures, said outer tube having one end sealably secured to the outermost fuel element and having a solid flange integrally formed at the other end, said flange having its outer periphery sealably secured to the inner wall of said pressure tube whereby the inlet coolant must flow over said fuel elements before leaving the pressure tube assembly.

16. A pressure tube assembly type neutronic reactor comprising an outer vessel; a solid moderator lattice supported within said vessel and having a plurality of openings extending therethrough; a plurality of pressure tube assemblies extending in a generally parallel spaced array through some of said lattice openings, each of said pressure tube assemblies comprising an elongated pressure tube having an inlet aperture and an outlet aperture, a plurality of annular fissile fuel elements located coaxially within said pressure tube, said fuel elements forming a plurality of flow passages communicating serially with one another and with said inlet and outlet apertures so as to provide a continuous flow passage from said inlet aperture to said outlet aperture, and a coolant flowing from said inlet aperture to said outlet aperture in a heat exchanging relationship with said annular fuel elements, said coolant being changed from a liquid to a superheated vapor by the absorption of heat from said fuel elements during the passage of said coolant through said flow passages; a plurality of control rods extending in a generally parallel spaced array through the remainder of said lattice openings; a plurality of said pressure tube assemblies grouped around each of said control rods; separate coolant flow control means for each group of said pressure tube assemblies located adjacent said same control rod; an inlet conduit coupled to each of said inlet apertures for supplying a liquid coolant to each of said pressure tube assemblies; and an outlet conduit coupled to each of said outlet apertures for removing the superheated vapor produced in said each of said pressure tube assemblies, said inlet and outlet conduits nested together between some of said pressure tube assemblies and said control rods located between the remainder of said pressure tube assemblies.

17. A pressure tube assembly type neutronic reactor comprising an outer vessel; a solid moderator lattice supported within said vessel and having a plurality of openings extending therethrough; a plurality of upstanding individually removable pressure tube assemblies extending in a uniformly parallel spaced array into some of said lattice openings; each of said pressure tube assemblies being re-entrant and arranged to pass through said outer vessel only once and comprising an elongated pressure tube having an inlet aperture and an outlet aperture formed in the upper portion of said pressure tube, said outlet aperture being above said inlet aperture, a tubular fuel assembly extension coaxially positioned within the upper portion of said pressure tube and annularly spaced therefrom to form a pair of passages communicating with said apertures, respectively, said upper end of said extension being sealably secured to the inner wall of said pressure tube at a point between said inlet and outlet apertures, a fuel assembly coaxially positioned within the lower portion of said pressure tube and supported by the lower end of said extension, said fuel assembly comprising a plurality of annular coextending fissile fuel elements forming a plurality of serially communicating flow passages therebetween, and a coolant flowing from said inlet aperture to said outlet aperture through said extension passages and in heat exchanging relationship with said annular fuel elements, said coolant being changed from a liquid to a superheated vapor by the absorption of heat from said fuel elements during the passage of said coolant through said flow passages, said fuel assembly extension and said fuel assembly being removable as a unit from said pressure tube; a plurality of upstanding control rods extending in a uniformly parallel spaced array through the remainder of said lattice openings; at least four of said pressure tube assemblies grouped around each of said control rods; separate coolant flow control means for each group of said pressure tube assemblies located adjacent said same control rod; an inlet conduit coupled to each of said inlet apertures for supplying a liquid coolant to each of said pressure tube assemblies; an outlet conduit coupled to each of said outlet apertures for removing the superheated vapor produced in each of said pressure tube assemblies, and said inlet and outlet conduits nested together between some of said pressure tube assemblies and said control rods located between the remainder of said pressure tube assemblies; and means for circulating a cooling fluid through said vessel in intimate contact with said moderator lattice and with the exterior surfaces of said pressure tube assemblies to promote heat transfer from said moderator lattice to said pressure tube assemblies.

18. A neutronic reactor comprising an outer vessel, a moderator disposed in said vessel, a plurality of pressure tube assemblies inserted into said moderator and having a portion thereof passing through said outer vessel, each of said pressure tube assemblies having an inlet aperture and an outlet aperture, a coolant entering said inlet aperture, means within each of said pressure tube assemblies for forming a plurality of reverse flow passages communicating serially with one another and with said inlet and outlet apertures, said forming means containing sufficient fissile fuel material to convert said coolant from a liquid to a superheated vapor as said coolant flows through said flow passages, and said superheated vapor being removable through said oulet aperture.

19. The combination of claim 18 wherein said moderator is a lattice of solid material forming a plurailty of openings into which said pressure tube assemblies are inserted, each of said pressure tube assemblies are re-entrant and are arranged to pass through said outer vessel only once, and said coolant is separate from said moderator.

References Cited by the Examiner
UNITED STATES PATENTS

| 3,009,867 | 11/1961 | Kinsey | 176—61 |
| 3,085,964 | 4/1963 | Ritz et al. | 176—60 |
| 3,093,565 | 6/1963 | Blockley et al. | 176—59 |
| 3,121,666 | 2/1964 | Wheelock | 176—54 |
| 3,125,493 | 3/1964 | D'Amore | 176—76 |
| 3,156,626 | 11/1964 | Huet | 176—54 |
| 3,183,167 | 5/1965 | Bradley | 176—59 |
| 3,183,168 | 5/1965 | Bell | 176—59 |
| 3,240,678 | 3/1966 | Hemmerle et al. | 176—52 |
| 3,249,506 | 5/1966 | Tower et al. | 176—55 |

FOREIGN PATENTS

| 1,222,856 | 1/1960 | France. |
| 822,220 | 10/1959 | Great Britain. |

References Cited by the Applicant
UNITED STATES PATENTS

| 3,053,746 | 9/1962 | Challender et al. |

FOREIGN PATENTS

| 886,323 | 1/1962 | Great Britain. |

CARL D. QUARFORTH, *Primary Examiner.*

L. DEWAYNE RUTLEDGE, *Examiner.*